(12) United States Patent
Möller

(10) Patent No.: US 7,600,921 B2
(45) Date of Patent: Oct. 13, 2009

(54) SPINDLE FOR A MACHINE TOOL, COMPRISING A BEARING ELEMENT WITH A CAPILLARY FEED LINE FOR SUPPLYING LUBRICANTS

(75) Inventor: Bernd Möller, Hersbruck (DE)

(73) Assignee: Paul Müller GmbH & Co. KG Unternehmens-Beteiligungen, Nürnberg (DE)

( * ) Notice: Subject to any disclaimer, the term of this patent is extended or adjusted under 35 U.S.C. 154(b) by 335 days.

(21) Appl. No.: 10/593,862

(22) PCT Filed: Mar. 16, 2005

(86) PCT No.: PCT/DE2005/000490

§ 371 (c)(1),
(2), (4) Date: Sep. 22, 2006

(87) PCT Pub. No.: WO2005/092565

PCT Pub. Date: Oct. 6, 2005

(65) Prior Publication Data

US 2007/0189650 A1 Aug. 16, 2007

(30) Foreign Application Priority Data

Mar. 22, 2004 (EP) ............................ 04006803

(51) Int. Cl.
*F16C 19/00* (2006.01)
*F16C 33/66* (2006.01)
(52) U.S. Cl. .................... 384/462; 384/467; 384/474; 384/475
(58) Field of Classification Search ......... 384/462–467, 384/471–476, 493; 184/6.26, 8, 27.1, 39.1
See application file for complete search history.

(56) References Cited

U.S. PATENT DOCUMENTS

| 2,853,948 | A | * | 9/1958 | Aspelin | ...................... | 384/313 |
| 3,042,462 | A | * | 7/1962 | Rosskopf | .................... | 384/466 |
| 3,555,962 | A | * | 1/1971 | Wolf et al. | .................. | 409/231 |
| 3,939,944 | A | * | 2/1976 | Mitchell et al. | ............ | 184/6.26 |
| 3,945,694 | A | * | 3/1976 | Vaillette | ..................... | 384/493 |

(Continued)

FOREIGN PATENT DOCUMENTS

DE        196 15 382 A       10/1997

(Continued)

OTHER PUBLICATIONS

International Search Report Jul. 25, 2005.

*Primary Examiner*—Marcus Charles
(74) *Attorney, Agent, or Firm*—Collard & Roe, P.C.

(57) ABSTRACT

A spindle for a machine-tool, especially an engine spindle, includes a housing for receiving an electric engine, a shaft received in bearing elements and driven by the electric engine, and especially a tool receiving element for a tool for machining workpieces, at least one bearing element including a capillary feeding line for supplying lubricant via a pump element. A bearing element for one such spindle includes at least one recess for receiving a capillary feeding line for supplying lubricant via a pump element. A method for operating one such spindle for a machine-tool carries out a temporal and/or quantitative dosing of lubricant according to the evaluation of a sensor element, in order to sufficiently lubricate at least one bearing element.

7 Claims, 4 Drawing Sheets

U.S. PATENT DOCUMENTS

| | | | |
|---|---|---|---|
| 4,137,997 A * | 2/1979 | Ando | 184/6.22 |
| 4,343,378 A * | 8/1982 | Bremer | 184/6.26 |
| 4,759,427 A * | 7/1988 | Onose et al. | 184/6.26 |
| 4,785,913 A * | 11/1988 | Maurer et al. | 184/6.26 |
| 4,942,944 A * | 7/1990 | Frey et al. | 384/465 |
| 5,007,504 A * | 4/1991 | Hallbach | 184/8 |
| 5,769,545 A | 6/1998 | Bently et al. | |
| 5,848,845 A * | 12/1998 | Jeng et al. | 384/466 |
| 6,357,922 B1 | 3/2002 | Harbottle et al. | |
| 6,398,509 B1 | 6/2002 | Okazaki et al. | |

FOREIGN PATENT DOCUMENTS

| | | | |
|---|---|---|---|
| EP | 420312 A1 * | 4/1991 | |
| EP | 589362 A1 * | 3/1994 | |
| EP | 0 854 314 A | 7/1998 | |
| JP | 61109914 A * | 5/1986 | |
| JP | 2002130590 A * | 5/2002 | |

* cited by examiner

US 7,600,921 B2

SPINDLE FOR A MACHINE TOOL, COMPRISING A BEARING ELEMENT WITH A CAPILLARY FEED LINE FOR SUPPLYING LUBRICANTS

CROSS REFERENCE TO RELATED APPLICATIONS

Applicant claims priority under 35 U.S.C. §119 of European Application No. 04 006 803.3 filed Mar. 22, 2004. Applicant also claims priority under 35 U.S.C. §365 of PCT/DE2005/000490 filed Mar. 16, 2005. The international application under PCT article 21(2) was not published in English.

BACKGROUND OF THE INVENTION

1. Field of the Invention

The invention relates to a spindle for a machine tool, a bearing element for a spindle for a machine tool and a method for operating a spindle for a machine tool.

2. Description of the Related Art

A conventional oil-air lubrication has already been known for a long time as prior art for supplying oil as lubricant to the bearing elements of spindles for machine tools. In an oil-air lubrication of this type, oil quantities are supplied in a pulse-like manner at specific intervals, whereby the supplied oil quantities may not fall below a certain minimum amount.

SUMMARY OF THE INVENTION

The object of the invention is to provide a spindle for a machine tool in which a bearing element can also be supplied with minimal amounts and uniformly with lubricant. Furthermore, a bearing element and a method for operating a spindle of this type are proposed.

For the spindle, the object is solved by providing at least one bearing element with a capillary feed line for supplying lubricant through a pump element. Advantageous embodiments of the spindle are described below. For the bearing element, the object is solved by providing the bearing element with at least one recess for receiving a capillary feed line for supplying lubricants through a pump element. For the method, the object is solved by carrying out a temporal and/or quantitative dosing of lubricant via a control circuit to sufficiently lubricate at least one bearing element.

In the spindle according to the invention, oil is supplied as lubricant via at least one capillary feed line to at least one bearing element. In contrast to the known oil-air lubrication, the oil is not conveyed by an air current, but within the capillary feed lines (capillary hoses or tubes) which are continually filled with oil, so that, when the supply is increased, an immediate reaction and oil supply takes place without delay at the required location, i.e. at the end of the respective capillary feed line, due to existing capillary feed lines. A uniform lubrication of even the smallest amounts, in particular of 10-100 μl/h (microliters per hour), is made possible.

The capillary feed lines typically have an aperture diameter of less than 2/10 mm, whereby feed lines according to conventional oil-air lubrication typically have an aperture diameter of at least 2 mm.

Advantageously, the capillary feed line is received in a recess (borehole) in the inner or outer ring of the bearing element (e.g. of a roller bearing, radially inclined ball bearing) and the lubricant is supplied directly to the rubbing contact without air as a transport medium. As a result, in comparison to the conventional oil-air lubrication, the bearing cannot be dried by blowing.

In an alternative embodiment, the oil is supplied almost directly to the bearing element through the capillary feed line and a final path to the bearing element is overcome by taking along oil at the end of the capillary line by means of the admission of air.

In an advantageous embodiment, the pump element is configured, for example, as a micro gear-ring pump or as a microvalve (e.g. in the form of piezoactors).

In an advantageous embodiment, the pump element is connected with a distributor element from which several capillary feed lines go off. As a result, a reliable distribution of the lubricant can be made possible for several bearing elements in the spindle.

The flow resistance of a capillary is proportional to the 4th power of the aperture diameter (Hagen-Poiseuille's law). The oil quantity supplied can be reduced to a few percent of the nominal volume flow of the pump element via an additional capillary return line (bypass) since the oil quantity conveyed by the pump element is divided in the ratio of the flow resistance of supply capillaries and bypass capillaries. As a result, the pump element can operate in an advantageous operating range.

The capillaries can be integrated in the pump element as a part of the oil supply or as capillary throttles (e.g. as a microsystematically produced meander or the like).

In an alternative embodiment, the pump element can be designed in such a way, e.g. by corresponding defined leakage flows or defined aperture geometries, that the properties of the bypass are realized by the pump characteristics themselves.

The cleanliness of the lubricant can be permanently increased in the secondary flow by a filter element in the bypass. The oil quantity conveyed by the pump element is divided in the ratio of the cross sections of a supply capillary or capillaries and bypass capillary.

According to an advantageous embodiment, the pump element, the distributor element and further elements can be integrated in the housing of the spindle in a space-saving manner.

The bearing element according to the invention has at least one recess for receiving a capillary feed line for supplying lubricants through a pump element. Bearing elements of this type can be used for a spindle that is designed as described and can be used to connect with capillary feed lines for supplying lubricants for lubricating the bearing body and the bearing.

With the method for operating the spindle according to the invention, a temporal and/or quantitative dosing of lubricant is carried out via an evaluation of a sensor element, in order to sufficiently lubricate at least one bearing element.

BRIEF DESCRIPTION OF THE DRAWINGS

The invention is described in greater detail with reference to examples of embodiments in the drawings, showing.

DETAILED DESCRIPTION OF PREFERRED EMBODIMENTS

Figure 1:
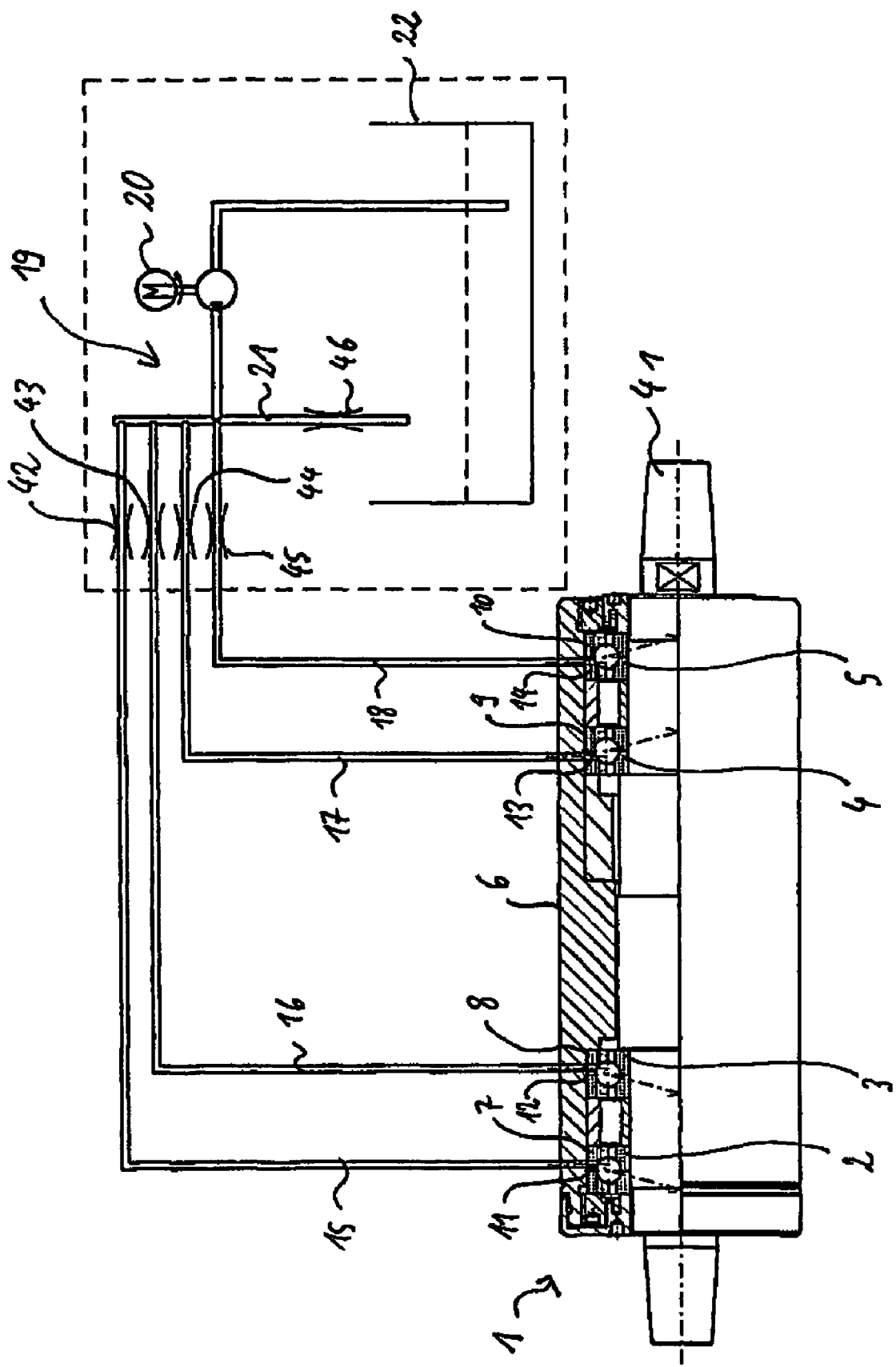
FIG. 1 a schematic overview of a spindle with capillary feed lines for supplying lubricants, FIG. 2 a first embodiment of bearing elements in a spindle according to FIG. 1, FIG. 3 a further embodiment of bearing elements of a spindle according to FIG. 1, and FIG. 4 a control circuit for a requirement-dependent lubricant dosing.

FIG. 1 shows a schematically illustrated spindle 1 for a machine tool (processing spindle) with a shaft accommodated in bearing elements 2, 3, 4 and 5, which are received in a housing 6 of the spindle 1. The outer rings 7, 8, 9 and 10 of the bearing elements 2, 3, 4 and 5 have recesses 11, 12, 13 and 14 (boreholes) for accommodating capillary feed lines 15, 16, 17 and 18, shown schematically and thus enlarged, which are configured e.g. as known capillary hoses.

In total, four capillary feed lines 15, 16, 17 and 18 are shown which are connected to a pump element 20 via a distributor 19. Furthermore, the distributor 19 can have capillary throttles 42, 43, 44 and 45 and has an additional capillary line 21, namely a bypass, which can also have a capillary throttle 46. The capillary throttles can be individually adjusted and be used to dose the conveyed quantity flows into the individual capillary feed lines and in the bypass.

The pump element 20 conveys lubricant, e.g. oil, from a storage vessel 22 and supplies the conveyed lubricant to the four capillaries 15, 16, 17 and 18. A part of the lubricant is diverted through the further capillary line 21 and, optionally filtered, supplied to the storage vessel 22.

Figure 2:
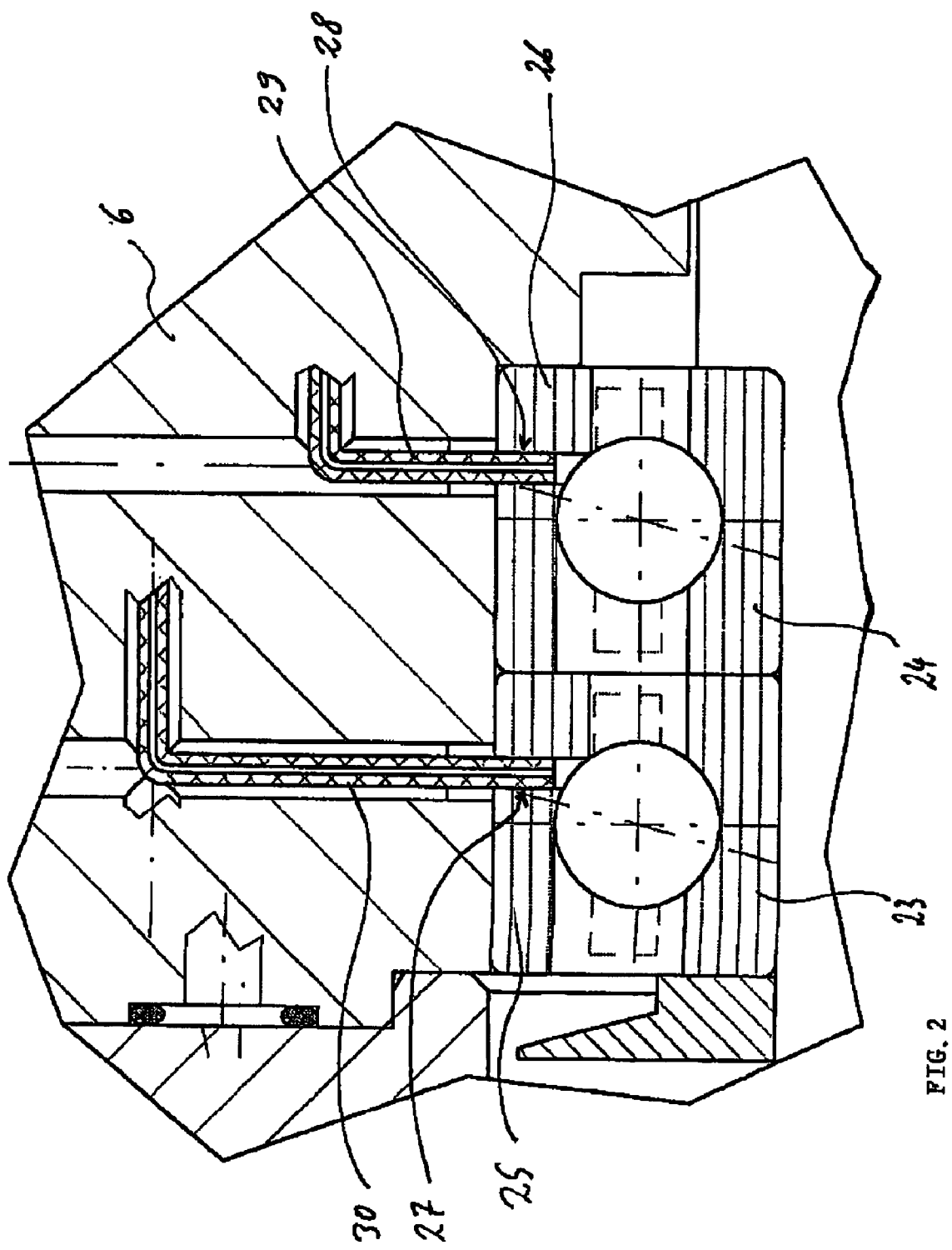

FIG. 2 shows one possible arrangement of bearing elements 23 and 24 directly adjacent to one another in a housing 6 of a spindle 1 according to FIG. 1. The outer rings 25 and 26 of the bearing elements 23 and 24 have recesses 27 and 28 for accommodating schematically illustrated capillary lines 29 and 30.

Figure 3:
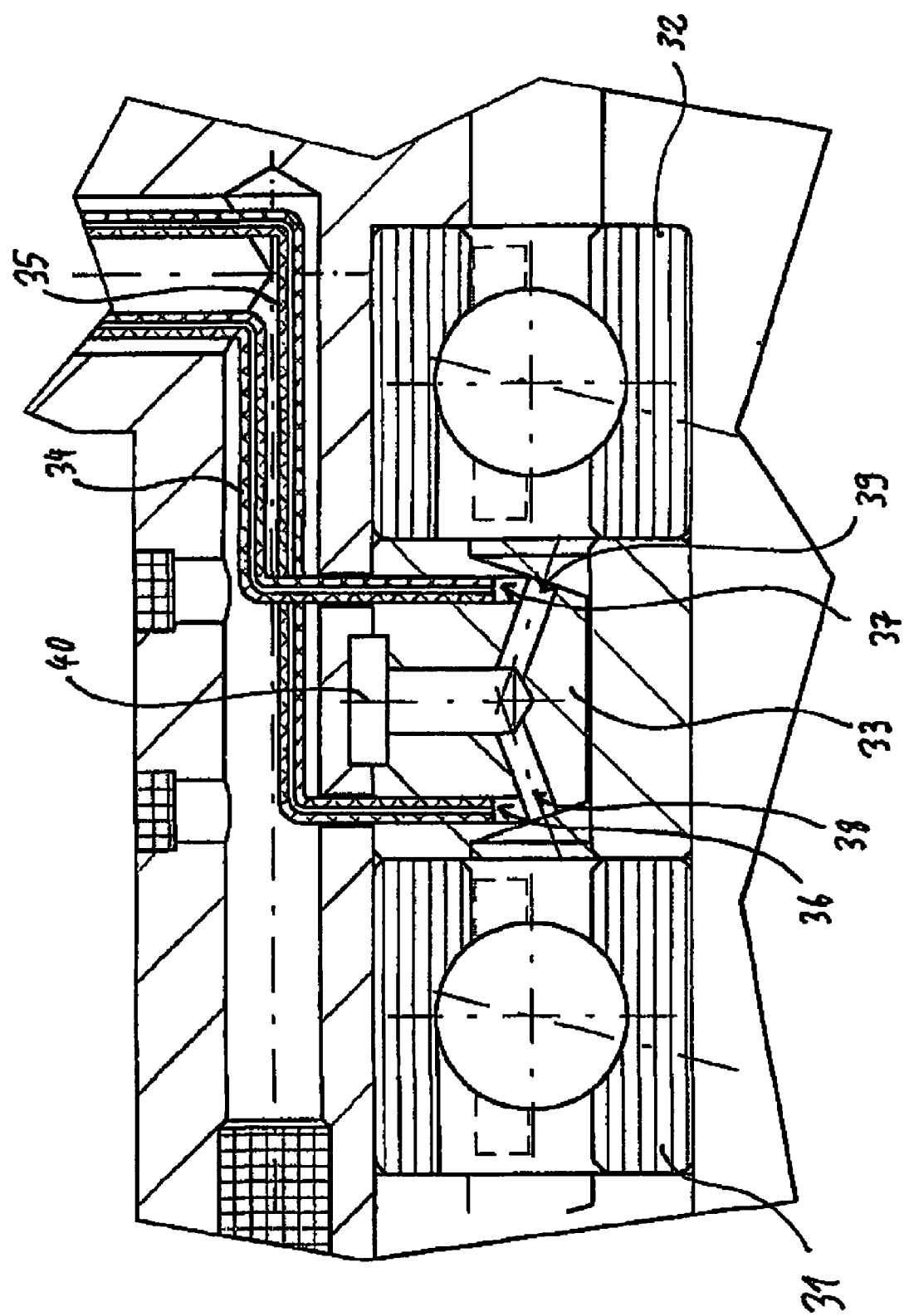

In a further embodiment, FIG. 3 shows bearing elements 31 and 32 which are accommodated at a distance from one another in the housing 6 of a spindle 1. A distributor element 33, into which capillary feed lines 34 and 35 lead, are situated between the bearing elements 31 and 32. These capillary feed lines 34 and 35 end at the extremities 36 and 37 and are laterally connected with the bearing elements 31 and 32 by connecting passages 38 and 39. Air is supplied via a borehole 40 and oil is picked up in the end regions 36 and 37 of the capillary feed lines 34 and 35 and supplied to the bearing elements 31 and 32 via the connecting passages 38 and 39.

Figure 4:
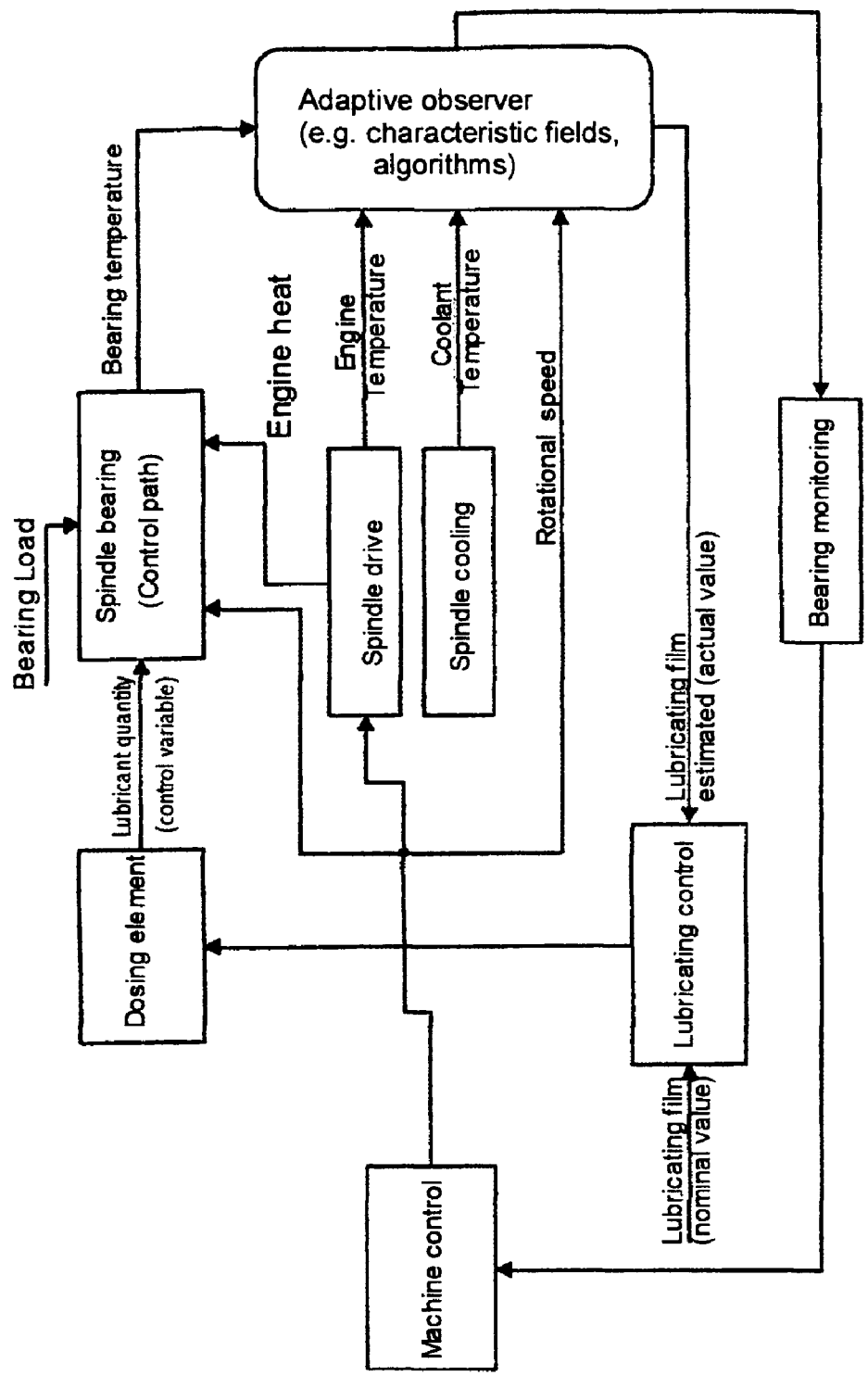

A self-explanatory control circuit can be seen in FIG. 4 which enables a requirement-dependent lubrication control. Operating parameters of the driven spindle 1 (e.g. rotational speed, engine temperature, coolant temperature, bearing temperature) can be detected via sensor elements and the strength of an oil film in the existing bearing elements can be estimated by known correlations. If a threshold value is fallen below in this case, an increased amount of lubricant can be supplied to the lubricating control via the dosing element, as a result of which the spindle bearing receives an additional oil film and thus remains adequately lubricated.

The dosing of the lubricant quantity and with it the change in the activity of the pump element can take place e.g. according to the following strategies:

- with fixed values over the entire operation time of the machine in dependency on the type of spindle, bearing design, etc. (comparable to previous lubricating methods) or
- controlled on the basis of characteristic fields, e.g. oil quantity=f (rotational speed of the spindle) or
- control on the basis of a direct oil film measurement on the bearing (currently, there is no reliable method available)
- control on the basis of an estimate of the thickness of the oil film with aid of easy-to-measure variables (bearing temperature, etc.).

All of the strategies can be applied individually or in combination.

The estimated thickness of the lubricating film can be used as a control variable, the lubricant quantity as a control variable.

REFERENCE NUMBERS

1 Spindle
2, 3, 4, 5 Bearing element
6 Housing
7, 8, 9, 10 Outer ring
11, 12, 13, 14 Recess
15, 16, 17, 18 Capillary feed line
19 Distributor
20 Pump element
21 Capillary feed line
22 Storage vessel
23, 24 Bearing element
25, 26 Outer ring
27, 28 Recess
29, 30 Capillary feed line
31, 32 Bearing element
33 Distributor element
34, 35 Capillary feed line
36, 37 Extremity
38, 39 Connecting passage
40 Borehole
41 Shaft
42, 43, 44, 45, 46 Throttle

The invention claimed is:

1. A spindle for a machine tool, comprising a housing for accommodating an electromotor and a shaft accommodated in bearing elements and driven by them, wherein at least one bearing element (2, 3, 4, 5) has a capillary feed line (15, 16, 17, 18) for supplying lubricant through a pump element (20) and a bore (40) is provided for the supply of air for collecting lubricant that emerges from the capillary feed line (15, 16, 17, 18).

2. The spindle according to claim 1, wherein the bearing element (2, 3, 4, 5) has a recess (11, 12, 13, 14) in the outer or inner ring for receiving the capillary feed line (15, 16, 17, 18).

3. The spindle according to claim 1, wherein several capillary feed lines (15, 16, 17, 18) are provided which are connected with the pump element (20) via a distributor element (19).

4. The spindle according to claim 3, wherein the distributor element (19) has a further capillary line (21) as bypass.

5. The spindle according to claim 1, wherein the spindle (1) has two adjacent bearing elements (2, 3, 4, 5) with a capillary feed line (15, 16, 17, 18) each.

6. The spindle according to claim 1, wherein the spindle (1) has two bearing elements (2, 3, 4, 5) which are adjacent and spaced to one another with a capillary feed line (15, 16, 17, 18).

7. A method for operating a spindle for a machine tool, the spindle comprising a housing for accommodating an electromotor and a shaft accommodated in bearing elements and driven by the bearing elements, wherein at least one bearing element has a capillary feed line for supplying lubricant through a pump element and a bore is provided for the supply of air for collecting lubricant that emerges from the capillary feed line, wherein at least one of a temporal dosing and a quantitative dosing of lubricant is carried out via a control circuit to sufficiently lubricate at least one bearing element.

* * * * *

UNITED STATES PATENT AND TRADEMARK OFFICE
CERTIFICATE OF CORRECTION

PATENT NO. : 7,600,921 B2
APPLICATION NO. : 10/593862
DATED : October 13, 2009
INVENTOR(S) : Bernd Möller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this

Fifth Day of October, 2010

David J. Kappos
*Director of the United States Patent and Trademark Office*